(12) United States Patent  
Clark

(10) Patent No.: US 7,128,259 B2
(45) Date of Patent: Oct. 31, 2006

(54) DETECTOR

(75) Inventor: Barrie Clark, Dundee (GB)

(73) Assignee: NCR Corporation, Dayton, OH (US)

( * ) Notice: Subject to any disclaimer, the term of this patent is extended or adjusted under 35 U.S.C. 154(b) by 61 days.

(21) Appl. No.: 10/739,513

(22) Filed: Dec. 18, 2003

(65) Prior Publication Data

US 2004/0130337 A1 Jul. 8, 2004

(30) Foreign Application Priority Data

Jan. 8, 2003 (GB) ................... 0300381.1

(51) Int. Cl.
*G07D 11/00* (2006.01)
(52) U.S. Cl. ..................... 235/379; 271/256
(58) Field of Classification Search ........... 271/258.04, 271/165, 256; 235/379; 324/228, 600
See application file for complete search history.

(56) References Cited

U.S. PATENT DOCUMENTS

| 4,639,666 A | * | 1/1987 | Strosser et al. ............. 324/202 |
| 5,087,027 A | * | 2/1992 | Acquaviva ............. 271/258.04 |
| 5,480,083 A | * | 1/1996 | Achelpohl ................. 225/100 |
| 5,798,650 A | | 8/1998 | Guth |

FOREIGN PATENT DOCUMENTS

| GB | 1 232 987 | 5/1971 |
| GB | 1 313 992 | 4/1973 |
| GB | 2 034 898 A | 6/1980 |
| GB | 2 248 301 A | 4/1992 |

OTHER PUBLICATIONS

Japanese Appln. No. 63-37639, Feb. 22, 1988, laid open as No. 1-213,671A, Aug. 28, 1989, to H. Yushimo (Ricoh Co. Ltd.).*

* cited by examiner

*Primary Examiner*—Steven S. Paik
*Assistant Examiner*—Daniel A. Hess
(74) *Attorney, Agent, or Firm*—Michael Chan

(57) ABSTRACT

A detector (10) for detecting an object (42) in a media item (40), such as a check or banknote is described. The detector (10) comprises first electrically conducting means (14), such as a roller, disposed on one side of a media path (32); second electrically conducting means (16), such as another roller, disposed on an opposing side of the media path (32); insulating means (30a,b) for electrically insulating the first and second conducting means (14,16); and impedance measuring means (38) for measuring the impedance between the first and second electrically conducting means (14,16). By measuring the impedance between the conducting means (14,16) it is possible to determine if an electrically conducting object (42) is being carried by a media item (40).

12 Claims, 5 Drawing Sheets

DETECTOR

BACKGROUND OF THE INVENTION

The present invention relates to a detector for detecting an object carried by a media item. In particular, the invention relates to a detector for detecting electrically conducting objects, such as staples or clips, carried by laminar media items such as checks, banknotes, and such like. The invention also relates to a self-service terminal, such as an automated teller machine (ATM), including a detector for detecting objects carried by media items.

In addition to dispensing cash, it is common for ATMs to receive deposits from users. These deposits typically comprise one or more checks and/or one or more banknotes. To validate the authenticity of these media items, it is conventional to image the front and rear faces of each media item using an optical imager in close proximity to or in contact with the media item.

If a user deposits a media item carrying an object, such as a staple, a paperclip, or such like, then this object may scratch the optical imager, thereby degrading the performance of the imager. This may result in the imager becoming completely inoperative, requiring a technician to visit the ATM and replace the imager. This incurs the cost of:

the ATM being out of service, at least for deposit transactions, the technician visiting the ATM, and a replacement imager.

As many components within an ATM are electrically conducting, it is not feasible to use a metal detector to detect an object carried by a media item. Furthermore, as the object is generally small compared with the media item to which it is attached, it is difficult to detect the object as it is being transported within an ATM.

SUMMARY OF THE INVENTION

It is among the objects of an embodiment of the present invention to obviate or mitigate one or more of the above disadvantages, or other disadvantages associated with prior art self-service terminals and/or object detectors.

According to a first aspect of the present invention there is provided a detector for detecting an object in a media item, the detector comprising first electrically conducting means disposed on one side of a media path; second electrically conducting means disposed on an opposing side of the media path; insulating means for electrically insulating the first and second conducting means; and impedance measuring means for measuring the impedance between the first and second electrically conducting means.

It will be appreciated that the present invention has the advantage that when a media item carrying an electrically conducting object passes between the first and second conducting means, the object allows current to flow between the conducting means. This allows the impedance detection means to indicate that an electrically conducting object is present.

The term impedance includes those embodiments where only a direct current (D.C.) is used, so that the impedance measured is actually the resistance between the first and second electrically conducting means. Preferred embodiments of the invention use D.C. instead of alternating current (A.C.), so in preferred embodiments there is no reactive (frequency varying) component in the impedance, only a resistive (frequency independent) component. However, in some embodiments, A.C. may be used.

The word "measuring", as used herein, is not limited to ascertaining a precise value of impedance, but includes detecting changes in impedance.

Preferably, the first and second conducting means are provided by rollers. The rollers may be made of electrically conducting material, such as a metal; or each roller may have conducting material applied to an external surface thereof. Alternatively, one of the conducting means may be provided by a roller and the other conducting means may be provided by a skid plate. In some embodiments, both conducting means may be provided by skid plates.

Preferably, the first and second conducting means are biased together by urging means. Suitable urging means include a coil spring, a leaf spring, and such like.

Preferably, the rollers are maintained in spaced relation by insulating portions located on opposing ends of one or both rollers. The insulating portions may be implemented by discs, such as ceramic or elastomeric discs. These insulating portions serve as insulating means. In other embodiments, the insulating means may be provided by an air gap between the first and second conducting means; or the insulating means may be provided by the media item so that the insulating means is only present when the media item is between the first and second conducting means. When the insulating means is provided by the media item, an object is detected if the impedance measuring means does not measure a high impedance for a predetermined length of time, corresponding to the length of the media item and the speed at which the item is transported.

Preferably, a substantial portion of the external surface of each of the first and second conducting means is electrically conducting. This has the advantage that alignment of a media item between the first and second conducting means is not critical, because the entire surface of a media item will pass between an electrically conducting portion, so even a small object will be detected on a media item as the item passes between the first and second conducting means.

In other embodiments, a relatively small portion of the external surface of each of the first and second conducting means may be electrically conducting, but this is less preferred because alignment of a media item with the electrically conducting portions would be critical. In such embodiments, it is contemplated that the electrically conducting external surface is at least the same size as the width of the media item being transported.

Preferably, the conducting means are disposed so that when a media item passes between the conducting means, the conducting means are in close proximity to or in contact with the media item.

Preferably, the first and second conducting means are arranged to allow a media item in the form of a financial instrument to pass therebetween. In other embodiments, the first and second conducting means may be arranged to allow thicker media items, such as fabric, to pass therebetween.

In some embodiments, the media item may be in the form of a web, such as a paper-based or rag-based substrate or fabric.

The term "carried by" includes objects attached to, adhering to, protruding through, and partially surrounding a media item. Provided an electrically conducting object extends from one side of a media item to the other side, the detector will detect the object.

The impedance measuring means may be implemented by means for attempting to pass an electrical current between the first and second conducting means; and current detection means for detecting current flow between the first and second conducting means.

The means for attempting to pass a current between the first and second conducting means may be in the form of terminals for connecting to a power supply, such as an A.C. or D.C. power supply. The current detection means may be implemented by an ammeter.

One advantage of this aspect of the invention is that a simple object detector is provided by apparatus that detects a short circuit or low impedance path caused by an electrically conducting object passing between two conductors.

According to a second aspect of the present invention there is provided a method of detecting an object in a media item, the method comprising the steps of: providing a first electrical conductor on one side of a media path, and a second electrical conductor on an opposing side of the media path; maintaining the first and second electrical conductors in electrical isolation; and measuring the impedance between the first and second electrical conductors while a media item is passing therebetween.

The step of measuring the impedance between the first and second electrical conductors may include the steps of attempting to pass a current between the first and second electrical conductors, and measuring any current flow.

The method may include the further step of indicating that an object is present when current flow is detected between the first and second conductors.

According to a third aspect of the present invention there is provided a detector for detecting objects carried by a media item, the detector comprising terminals disposed on opposing sides of a media item path and electrically isolated from each other; and an impedance measurement circuit, whereby, when a media item is being conveyed the impedance measurement circuit measures the impedance between the terminals.

The detector may include a power supply or may receive power from an external power source.

According to a fourth aspect of the present invention there is provided a method of detecting an object in a media item, the method comprising the steps of attempting to pass current through terminals disposed on opposing sides of a media path, and indicating the presence of an object when current flow is detected.

According to a fifth aspect of the present invention there is provided a media acceptance module incorporating the detector of the first or third aspects of the present invention.

The media acceptance module may be a check processing module, a banknote acceptance module, a currency recycling module, or such like.

According to a sixth aspect of the present invention there is provided a self-service terminal including the module of the fifth aspect of the present invention.

According to a seventh aspect of the invention there is provided a self-service terminal including the detector of the first or third aspects of the present invention.

The self-service terminal may be an ATM. The ATM may allow currency recycling, and/or check deposits and/or check cashing, and/or banknote depositing.

The word "media" is used herein in a generic sense to denote one or more items, documents, or such like; the word "media" when used herein does not necessarily relate exclusively to multiple items or documents. Thus, the word "media" may be used to refer to a single item (rather than using the word "medium") and/or to multiple items. A media item may be paper-based or non-paper-based; a media item may be laminar in form, or may have any other convenient shape.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
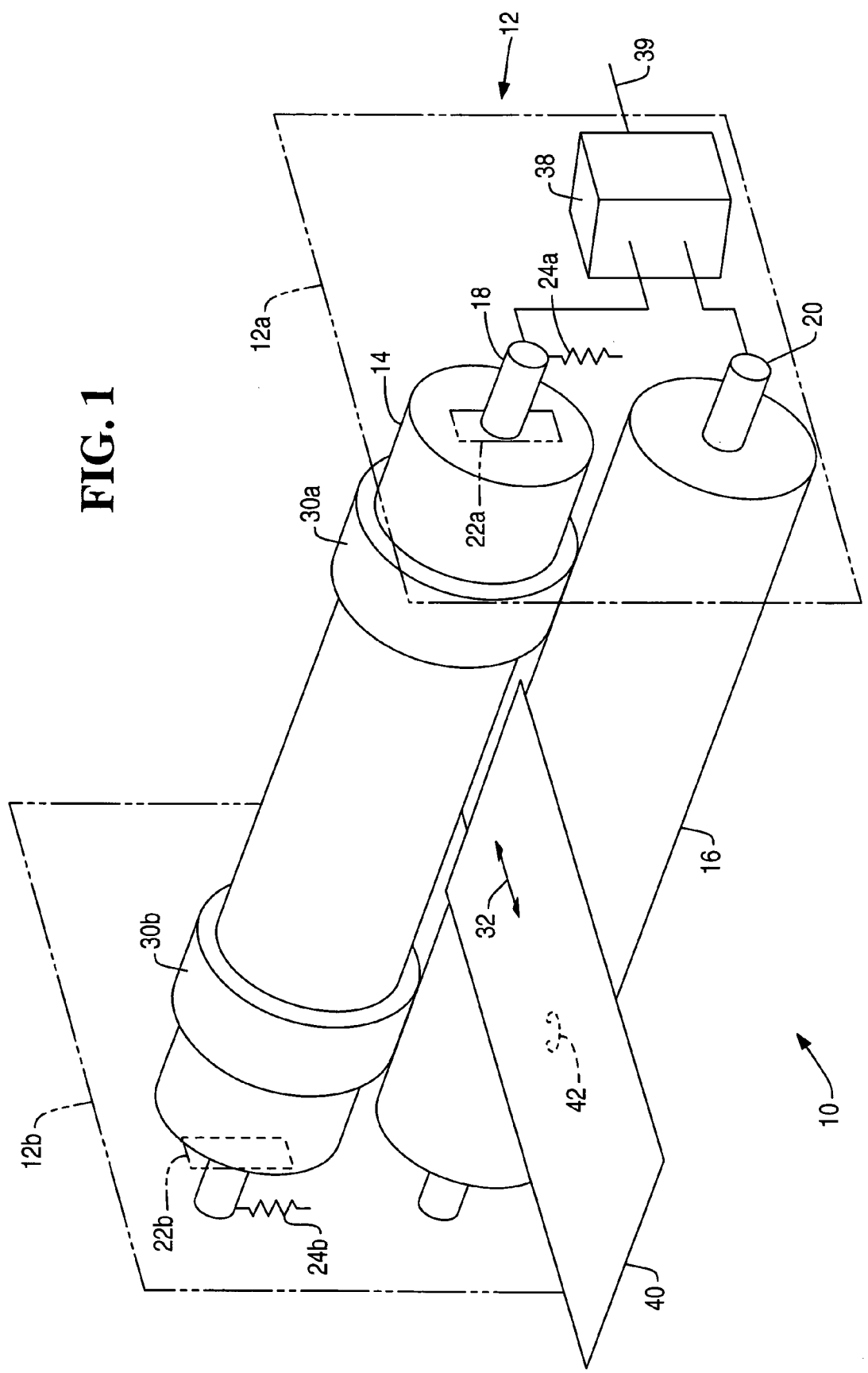
FIG. 1 is a pictorial diagram of a detector according to one embodiment of the present invention.

Reference is first made to FIG. 1, which illustrates an electrically conducting object detector 10 according to one embodiment of the present invention. The detector 10 comprises a housing 12 (only part of which is shown, and that part is shown as a broken line for clarity). The housing 12 supports first electrically conducting means 14 in the form of an upper roller, and second electrically conducting means 16 in the form of a lower roller. The rollers 14,16 are rotatably mounted on upper and lower axles 18,20, respectively. The axles 18,20 extend between opposing sides 12a,12b of the housing 12. In this embodiment, the lower axle 20 is held in position by fixed bearings (not shown) in the housing sides 12a,b; whereas, the upper axle 18 is mounted on slideable bearings (not shown) that are free to move within slots 22a,b defined by the housing sides 12a,b. Slots 22a,b are located to allow the upper axle 18 to move radially away from the lower axle 20; however urging means 24, in the form of a pair of coil springs 24a,b, is used to bias the upper axle 18 towards the lower axle 20.

The upper roller 14 includes insulating means 30 in the form of two insulating discs 30a,b located near opposing ends of the upper roller 14. The discs 30a,b are made of elastomeric material, and have an external diameter approximately 2 mm thicker than that of the upper roller 14 and are in contact with the lower roller 16, so that there is a gap of approximately 1 mm between the upper and lower rollers 14,16. This gap provides a media path (indicated by arrow 32) along which media items are transported. The gap of approximately 1 mm was selected as a compromise between detecting extremely thin objects (which requires a very small gap), and not unduly slowing down the media item being transported (which requires a larger gap).

Impedance measuring circuitry 38 is provided and electrically coupled to the upper and lower rollers 14,16 to measure the impedance therebetween. The measuring circuitry 38 has an output 39 indicating whether the impedance is high or low.

During operation, when a laminar media item 40, such as a check, carrying an electrically conducting object 42 such as a staple, is transported along the media path 32 between the upper roller 14 and the lower roller 16, a sudden decrease in impedance will be measured by the impedance measuring circuitry 38 when the staple 42 comes into contact with both the upper and lower rollers 14,16.

Figure 2:
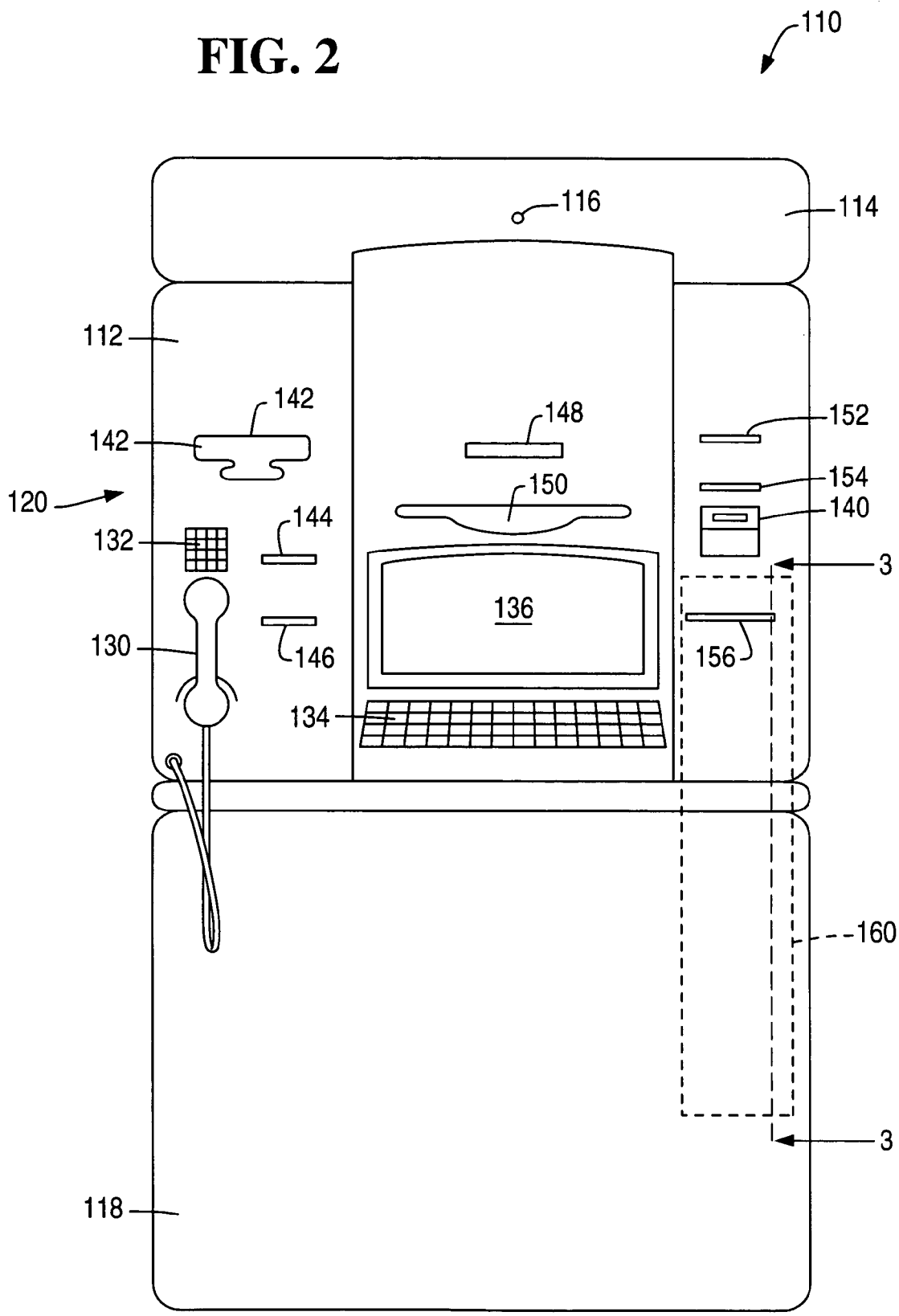
FIG. 2 is a pictorial diagram of a check deposit ATM embodying the present invention.

Reference is now made to FIG. 2, which illustrates a self-service terminal (SST) 110 incorporating the detector 10

(not shown in FIG. 2). The SST is a check deposit ATM. The ATM 110 comprises a fascia 112 pivotably coupled to a chassis (not shown); an upper panel 114 mounted to the chassis and defining an aperture 116 through which a camera (not shown) images a user of the ATM 110; and a lower panel 118 hingeably coupled to the chassis (not shown) so that the lower panel 118 can be opened to reveal a safe (not shown) mounted in the chassis (not shown). When the lower panel 118 is open, the fascia 112 can be pivoted upwards to reveal ATM modules mounted within the chassis (not shown).

The fascia 112 provides a user interface 120 for allowing a user to execute a transaction. The fascia 112 includes a handset 130 and a telephone keypad 132 for allowing a user to contact a remote operator (not shown) typically located in a call center (not shown).

The fascia 112 also includes an encrypting keyboard 134 for allowing a user to enter transaction details, and a display 136 for presenting screens to a user. The fascia 112 also defines eight slots for receiving and dispensing media items, and a tray 140 into which coins can be dispensed. The slots include: a money order printer slot 142, a bunch note input slot 144, a bunch note exit slot 146, a statement output slot 148, a cash dispense slot 150, a card reader slot 152, a card issue slot 154, and a check input/output slot 156. The slots 142 to 156 and tray 140 are arranged so that when the fascia 112 is closed, the slots and tray align with corresponding ATM modules mounted within the ATM's chassis (not shown). The user interface features described above are all provided on an NCR PERSONAS (trade mark) 5878 financial services center ATM, available from NCR Financial Solutions Group Limited, Discovery Center, 3 Fulton Road, Dundee, DD2 4SW, Scotland.

Figure 3:
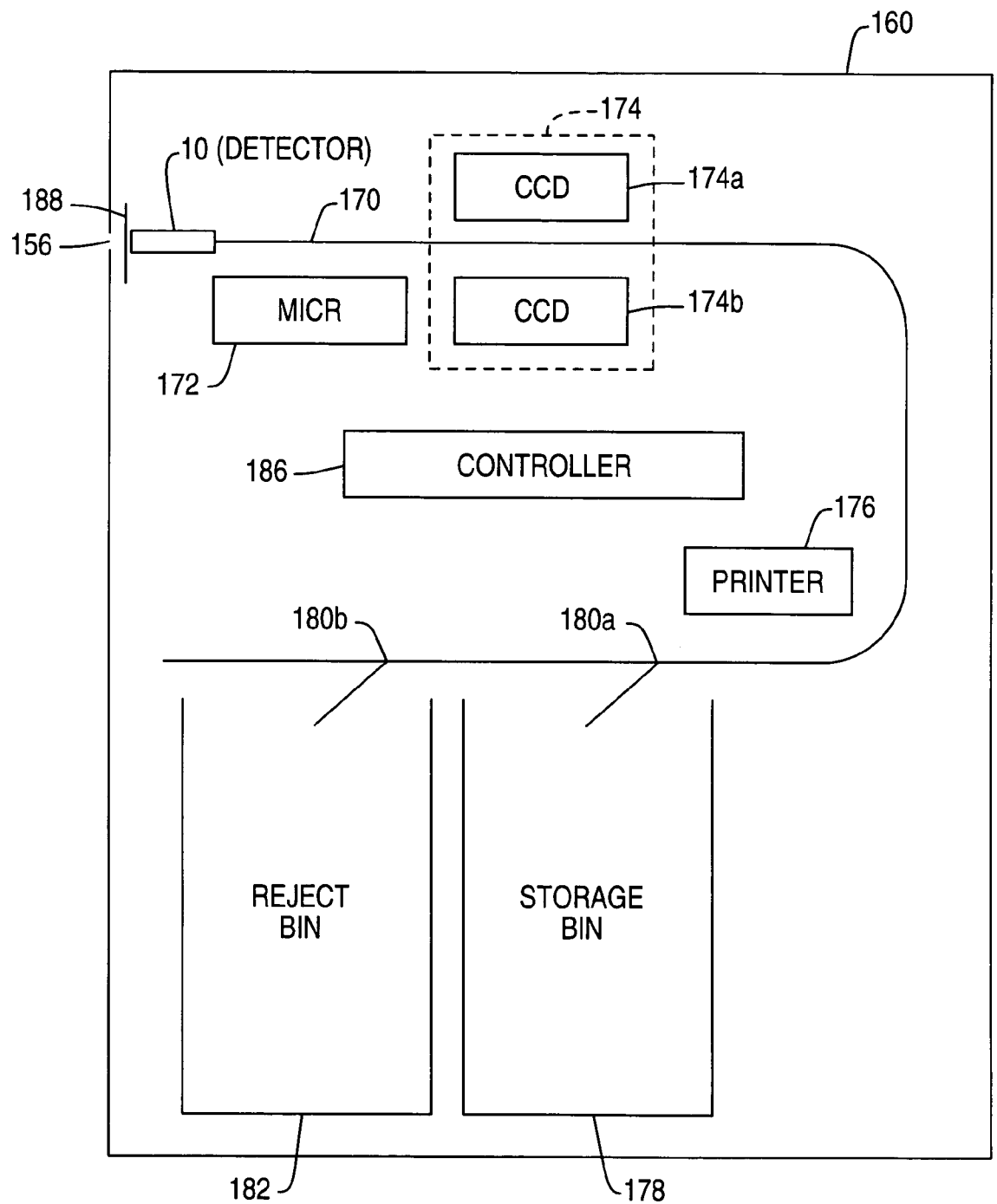
FIG. 3 is a simplified schematic sectional diagram, taken approximately along line 3—3 in FIG. 2, and showing a part (the check processing module) of the ATM of FIG. 2.
Figure 4:
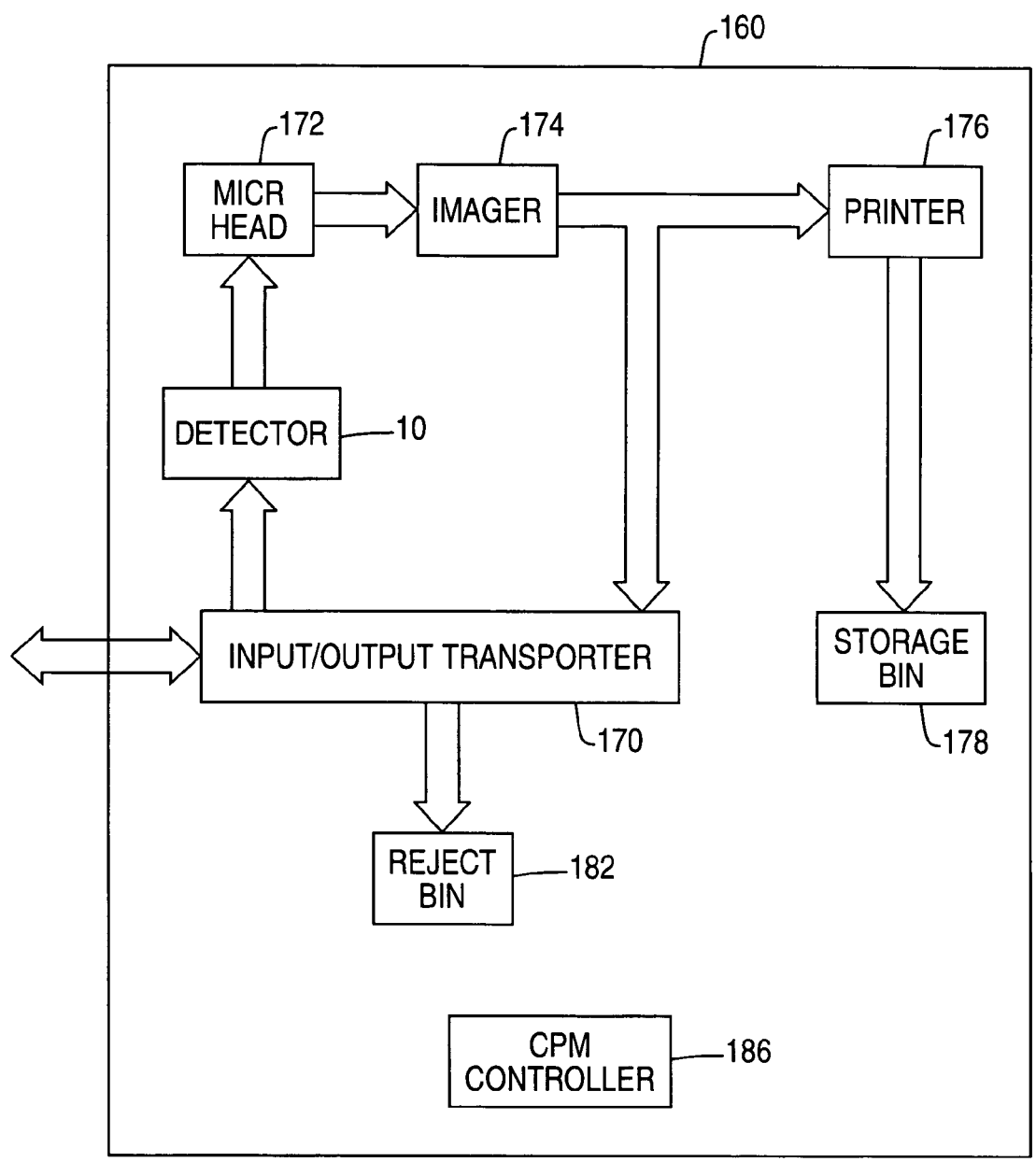
FIG. 4 is a block diagram of the check processing module of FIG. 3.

The ATM also includes a check processing module (CPM) 160, which will now be described with reference to FIGS. 3 and 4. FIG. 3 is a simplified schematic sectional diagram (along line 3—3 in FIG. 2) showing part of the fascia 112 and lower panel 118, and the main parts of the CPM 160. FIG. 4 is a block diagram illustrating the main elements in the CPM 160. The CPM 160 is a modified version of a conventional check processing module, such as the check processing module provided with the PERSONAS (trade mark) 5878 NCR ATM.

The CPM 160 comprises the following elements: the detector 10, a check input/output transport mechanism 170 including an alignment mechanism for aligning a check; a MICR head 172 for reading magnetic details on a code line of a check; an imager 174 including an upper 174a and lower 174b CCD camera for capturing an image of each side of a check (front and rear); a printer 176 for endorsing a check; a storage bin 178 for storing processed checks, and a reject bin 182 for storing rejected checks. The transport mechanism 170 includes two divert gates 180a, 180b for diverting checks to either the storage bin 178 or the reject bin 182. Elements 170 to 182 are conventional and will not be described in detail herein. The CPM 160 also includes a controller 186 for controlling the operation of the elements within the CPM 160, and an entrance shutter 188 for opening and closing the check input/output slot 156.

Figure 5:
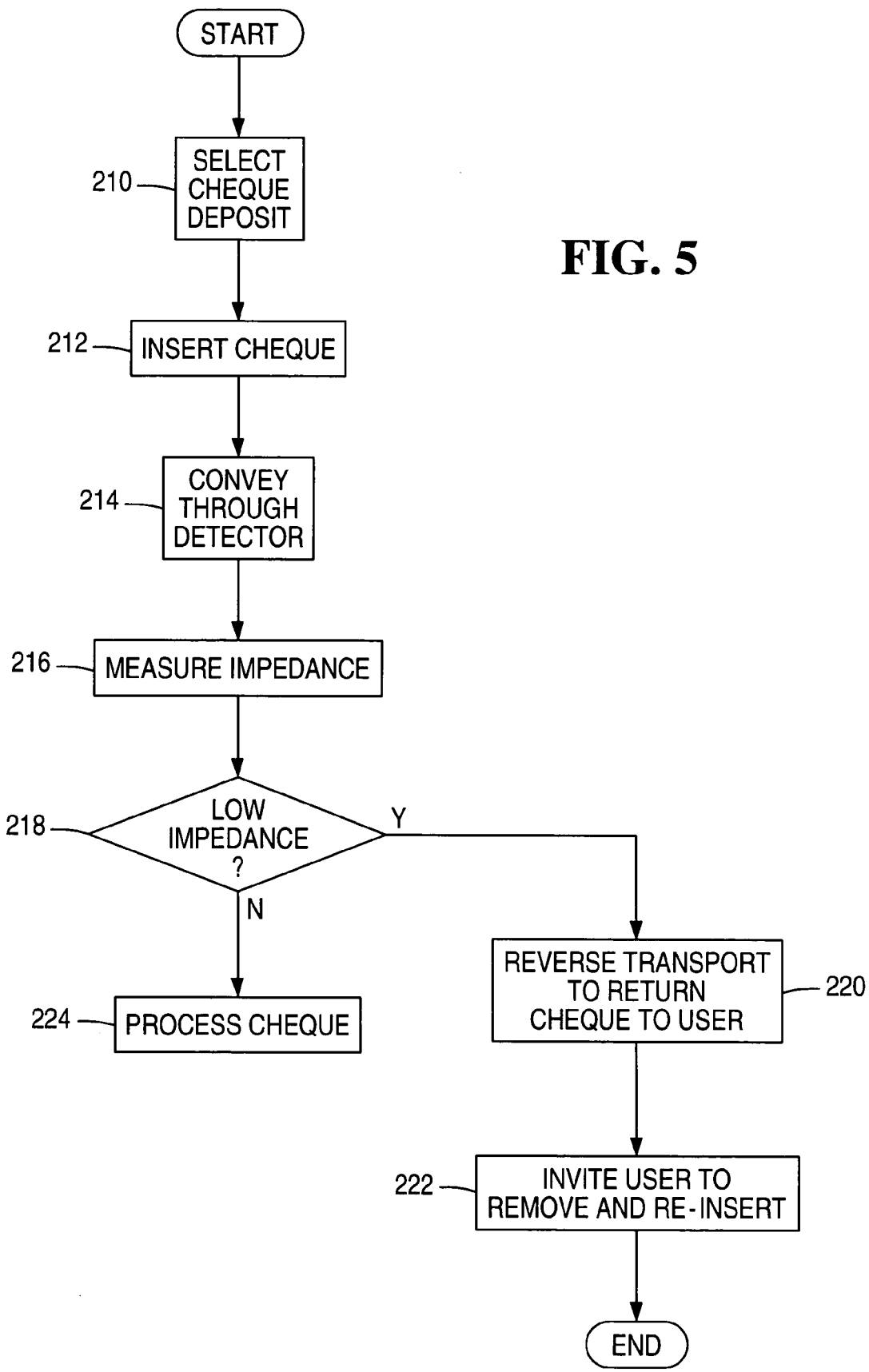
FIG. 5 is a flowchart illustrating the initial steps involved when a media item is deposited in a transaction at the ATM of FIG. 2.

A typical transaction will now be described with reference to FIG. 5, which is a flowchart 200 illustrating the steps involved in a check deposit transaction, and also with reference to FIGS. 1 to 4.

In a check deposit transaction, a user selects a check deposit option using the ATM user interface 120 (step 210), and inserts a check 40a to be deposited through the check input/output slot 156 (step 212). The input/output transporter 170 draws in this check 40a, and conveys it through the detector 10 along media path 32 (step 214).

While the check 40a is being transported, the detector 10 measures the impedance between the rollers 14,16 (step 216).

If the check 40a carries an object 42 such as a staple or clip, then the detector 10 measures a low impedance when the object 42 passes between the upper and lower rollers 14,16.

If a low impedance is detected while the check 40a passes between the rollers 14,16 (step 218) then the CPM controller 186 instructs the input/output transporter 170 to return the check 40a to the user (step 220), and the ATM 110 displays a message to the user on display 136 inviting him/her to remove the object 42 and then re-insert the check 42 (step 222).

If no low impedance is detected (step 218), then the transporter 170 conveys the check 40a to the MICR head 172 for processing by the CPM 160 as for a conventional check deposit transaction (step 224).

Although the above-described embodiment relates to a check being deposited in its entire amount by an ATM user, it is contemplated that the check may be cashed, either in full or as a partial amount of the entire amount of the check at the ATM 110, with the remaining amount of the check being deposited to a banking account or being charged as a transaction fee.

The above embodiment has the advantage of screening media items as they are inserted into an ATM 110, and returning any items carrying objects, such as staples, clips, and such like. This prevents an ATM from processing a check carrying objects that may damage parts of the ATM 110.

Various modifications may be made to the above described embodiment within the scope of the present invention. For example, the detector 10 may be incorporated into a currency acceptor module instead of or in addition to a check processing module. In other embodiments, media items other than financial instruments may be screen for electrically conducting objects, for example media items such as clothes. In other embodiments the insulating means may be provided by an air gap, or any other convenient arrangement for maintaining the first and second electrical conducting means in mutual electrical isolation. In other embodiments, if insulating portions are used, they may be located on either the first conducting means or the second conducting means, or on both. In other embodiments the discs may be mounted on a roller, or on an axle on which the roller is mounted.

What is claimed is:

1. A detector for detecting an object in a media item, the detector comprising:
   a first electrical conducting member disposed on one side of a media path;
   a second electrical conducting member disposed on an opposite side of the media path;
   a first insulating member which is other than a media item and which is disposed on one end portion of the first electrical conducting member to electrically isolate the first and second electrical conducting members;
   a second insulating member which is other than a media item and which is disposed on an opposite end portion of the first electrical conducting member to electrically isolate the first and second electrical conducting members; and
   an impedance measuring circuit for measuring impedance at a location which is between the first and second electrical conducting members and between the first and second insulating members to determine if an object is present in the media item as the media item is transported along the media path.

2. A detector according to claim 1, wherein the first and second electrical conducting members comprise rollers.

3. A detector according to claim 1, further comprising urging means for biasing the first and second electrical conducting towards each other.

4. A detector according to claim 1, wherein the first and second electrical conducting members are disposed so that the first and second electrical conducting members are in contact with the media item when the media item passes between the first and second electrical conducting members and between the first and second insulating members.

5. A self-service terminal comprising:
means for receiving a single sheet media item deposited by a self-service customer conducting a self-service transaction;
means defining a media item path along which the deposited single sheet media item can be transported;
a first electrical conductor disposed on one side of the media item path;
a second electrical conductor disposed on an opposite side of the media item path;
a pair of insulating discs mounted on one of the first and second electrical conductors and for electrically isolating the first and second electrical conductors; and
impedance measuring means for measuring impedance between the first and second electrical conductors to determine if an object is present in the deposited single sheet media item being transported along the media item path.

6. A self-service terminal according to claim 5, wherein each of the first and second electrical conductors comprises a number of rollers.

7. A self-service terminal according to claim 5, further comprising urging means for biasing the first and second electrical conductors towards each other.

8. A detector according to claim 1, wherein each of the first and second insulating members comprises elastomeric material.

9. A self-service terminal according to claim 6, wherein the first and second electrical conductors are disposed so that the first and second electrical conductors are in contact with the single sheet media item as the single sheet media item passes between the first and second electrical conductors and between the pair of insulating discs along the media item path.

10. A self-service terminal according to claim 6, wherein the impedance measuring means includes means for attempting to pass a current between the first and second electrical conductors.

11. A self-service terminal according to claim 10, wherein the impedance measuring means includes means for measuring current flow between the first and second electrical conductors when current is attempted to be passed between the first and second electrical conductors.

12. A self-service terminal according to claim 11, further comprising means for indicating the presence of an object in the single sheet media item when current flow between the first and second electrical conductors is detected.

* * * * *